(12) United States Patent
Kolavennu et al.

(10) Patent No.: US 11,869,201 B2
(45) Date of Patent: ***Jan. 9, 2024

(54) SYSTEMS AND METHODS FOR IDENTIFYING A UNIFIED ENTITY FROM A PLURALITY OF DISCRETE PARTS

(71) Applicant: Ademco Inc., Golden Valley, MN (US)

(72) Inventors: Soumitri Kolavennu, Blaine, MN (US); Nathaniel Kraft, Minnetonka, MN (US)

(73) Assignee: ADEMCO INC., Golden Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,303

(22) Filed: May 2, 2022

(65) Prior Publication Data

US 2022/0262155 A1 Aug. 18, 2022

Related U.S. Application Data

(63) Continuation of application No. 16/859,214, filed on Apr. 27, 2020, now Pat. No. 11,335,112.

(51) Int. Cl.
*G06T 7/246* (2017.01)
*G06T 7/20* (2017.01)
(Continued)

(52) U.S. Cl.
CPC ............ *G06T 7/251* (2017.01); *G06F 18/214* (2023.01); *G06N 5/04* (2013.01); *G06N 20/00* (2019.01);
(Continued)

(58) Field of Classification Search
CPC ............ G06K 9/00362; G06K 9/6256; G06K 9/3233; G06N 5/04; G06N 20/00;
(Continued)

(56) References Cited

U.S. PATENT DOCUMENTS 7,634,662 B2 12/2009 Monroe
10,140,718 B2 11/2018 Chen et al.
(Continued)

FOREIGN PATENT DOCUMENTS

CN 108921001 A 11/2018
CN 110414305 A 11/2019
WO 2019202587 A1 10/2019

OTHER PUBLICATIONS

Chee Seng Chan , "A Fuzzy Qualitative Approach to Human Motion Recognition," Sep. 23, 2008, 2008 IEEE International Conference on Fuzzy Systems (IEEE World Congress on Computational Intelligence), pp. 1242-1247.*
(Continued)

*Primary Examiner* — Omar S Ismail
(74) *Attorney, Agent, or Firm* — Fredrikson & Byron, P.A.

(57) ABSTRACT

Disclosed systems and methods can include capturing the sequence of images of a monitored region that includes a sub-region of interest, processing the sequence of images using heuristics and rules of an artificial intelligence model to identify the plurality of discrete parts that are associated with a type of a unified entity, and processing the sequence of images using the heuristics and the rules of the artificial intelligence model to virtually link together a group of the plurality of discrete parts that correspond to a specific embodiment of the unified entity that is present in the sub-region of interest, wherein the heuristics and the rules of the artificial intelligence model can be developed from a training process that includes the artificial intelligence model receiving sample images delineating exemplary discrete parts on exemplary embodiments of the unified entity.

20 Claims, 3 Drawing Sheets

(51) Int. Cl.
| | |
|---|---|
| *G06N 5/04* | (2023.01) |
| *G06V 40/10* | (2022.01) |
| *G06V 10/25* | (2022.01) |
| *G06T 7/70* | (2017.01) |
| *G06N 20/00* | (2019.01) |
| *G06F 18/214* | (2023.01) |
| *G06V 10/774* | (2022.01) |

(52) U.S. Cl.
CPC .................. *G06T 7/20* (2013.01); *G06T 7/70* (2017.01); *G06V 10/25* (2022.01); *G06V 10/774* (2022.01); *G06V 40/10* (2022.01); *G06T 2207/10016* (2013.01); *G06T 2207/20081* (2013.01); *G06T 2207/30196* (2013.01)

(58) Field of Classification Search
CPC ... G06T 7/70; G06T 7/20; G06T 2207/30196; G06T 2207/10016; G06T 2207/20081
See application file for complete search history.

(56) References Cited

U.S. PATENT DOCUMENTS

| | | | |
|---|---|---|---|
| 10,475,311 | B2 | 11/2019 | Siminoff |
| 10,489,887 | B2 | 11/2019 | El-Khamy et al. |
| 10,726,274 | B1 | 7/2020 | Hasegawa et al. |
| 11,304,123 | B1 | 4/2022 | Noonan et al. |
| 2006/0212341 | A1 | 9/2006 | Powers |
| 2009/0222388 | A1* | 9/2009 | Hua .................. G06N 5/02 382/103 |
| 2009/0319361 | A1 | 12/2009 | Conrady |
| 2015/0363500 | A1 | 12/2015 | Bhamidipati et al. |
| 2016/0065861 | A1* | 3/2016 | Steinberg ............ H04N 23/80 348/239 |
| 2017/0083790 | A1 | 3/2017 | Risinger et al. |
| 2017/0085844 | A1 | 3/2017 | Scalisi et al. |
| 2017/0092109 | A1 | 3/2017 | Trundle et al. |
| 2018/0059660 | A1 | 3/2018 | Heatzig et al. |
| 2018/0121571 | A1 | 5/2018 | Tiwari et al. |
| 2018/0268674 | A1 | 9/2018 | Siminoff |
| 2018/0285648 | A1 | 10/2018 | Pan et al. |
| 2018/0307903 | A1 | 10/2018 | Siminoff |
| 2019/0035242 | A1 | 1/2019 | Vazirani |
| 2019/0130278 | A1 | 5/2019 | Karras et al. |
| 2019/0130583 | A1* | 5/2019 | Chen .................. G06T 7/194 |
| 2019/0197848 | A1 | 6/2019 | Bradley et al. |
| 2020/0019921 | A1* | 1/2020 | Buibas ............... G06V 20/52 |
| 2020/0020221 | A1* | 1/2020 | Cutler ............... G08B 21/088 |
| 2020/0135182 | A1 | 4/2020 | Kahlon et al. |
| 2020/0301936 | A1 | 9/2020 | Miller et al. |
| 2020/0394804 | A1* | 12/2020 | Barton ............... G06V 10/82 |
| 2021/0209349 | A1* | 7/2021 | Mehl .................. G06T 7/70 |

OTHER PUBLICATIONS

Liang Zhao, "Stereo- and Neural Network-Based Pedestrian Detection," Sep. 2000, IEEE Transactions on Intelligent Transportation Systems ( vol. 1, Issue: 3, Sep. 2000), pp. 148-152.*

Zhennan Yan,"Multi-Instance Deep Learning: Discover Discriminative Local Anatomies for Bodypart Recognition,"Feb. 3, 2016, IEEE Transactions on Medical Imaging, vol. 35, No. 5, May 2016,pp. 1333-1340.*

Amir Nadeem1,"Automatic human posture estimation for sport activity recognition with robust body parts detection and entropy markov model,"Mar. 16, 2021, Multimedia Tools and Applications (2021) 80:21465-21498,pp. 21466-21480.*

Manoranjan Paul,"Human detection in surveillance videos and its applications—a review,Nov. 22, 2013,"Paul et al. EURASIP Journal on Advances in Signal Processing 2013, 2013:176,http://asp.eurasipjournals.com/content/2013/1/176,pp. 3-10.*

Tingzhuang Liu,"A video drowning detection device based on underwater computer vision," Feb. 5, 2023,THe Institution of Engineering and Technology,DOI: 10.1049/ipr2.12765, pp. 1910-1916.*

How-Lung Eng,"DEWS: A Live Visual Surveillance System for Early Drowning Detection at Pool," Feb. 8, 2007, IEEE Transactions on Circuits and Systems for Video Technology, vol. 18, No. 2, Feb. 2008,pp. 197-208.*

Zhao, Liang, et al., "Stereo- and Neural Network-Based Pedestrian Detection," Sep. 2000, IEEE Transactions on Intelligent Transportation Systems ( vol. 1, Issue: 3, Sep. 2000), pp. 148-152.

Chan, Chee Seng, et al., "A Fuzzy Qualitative Approach to Human Motion Recognition," Sep. 23, 2008, 2008 IEEE International Conference on Fuzzy Systems (IEEE World Congress on Computational Intelligence), pp. 1242-1247.

Paul, Manoranjan, et al., EURASIP Journal on Advances in Signal Processing, Human detection in surveillance videos and its applications a review, 2013, http://asp.eurasipjournals.com/content/2013/1/176, 16 pgs.

Yang, Yuxiang, et al. "Depth map super-resolution using stereovision-assisted model." Neurocomputing 149 (2015): 1396-1406.

Yan, Zhennan, et al., "Multi-Instance Deep Learning: Discover Discriminative Local Anatomies for Bodypart Recognition," Feb. 3, 2016, IEEE Transactions on Medical Imaging, vol. 35, No. 5, May 2016, pp. 1333-1340.

Lai Wei-Sheng et al "Deep Laplacian Pyramid Networks for Fast and Accurate Super-Resolution" , 2017 IEEE Conference on Computer Vision and Pattern Recognition, IEEE Computer Society, US, Jul. 21, 2017, 9 pgs.

Xu Jia et al "Super-Resolution with Deep Adaptive Image Resampling", arxiv.org, Cornell University Library, Ithaca, NY 14853, Dec. 18, 2017, 10 pgs.

Wang, Yifan, et al. "Resolution-aware network for image super-resolution." IEEE Transactions on Circuits and Systems for Video Technology 29.5 (2018): 1259-1269.

Europe IBM Intelligent Video Analytics V3.0, 5725-H94 IBM Intelligent Video Analytics V3.0, IBM Europe Sales Manual, Revised Apr. 23, 2019, https://www-01.ibm.com/common/ssi/ShowDoc.wss?docURL=/common/ssi/rep_sm/4/877/ENUS5725-H94/index.html&lang=en&request_locale=en, 15 pgs.

Yang, Wenming, et al. "LCSCNet: Linear compressing-based skip-connecting network for image super-resolution." IEEE Transactions on Image Processing 29 (2019): 1450-1464.

Rechelle Ann Fuertes, Max Planck Institute for Intelligent Systems, New EnhanceNet-PAT AI Turns Low-Resolution Images into High-Res., https://edgy.app/new-ai-system-to-turn-low-resolution-images-to-high-resolution, Oct. 30, 2017, 4 pgs.

Taking Motion Analytics to a New Level With AI, AI Motion Analytics Software Solutions, Artificial Intelligence, Jan. 9, 2020, https://www.osplabs.com/ai-motion-analytics/, 4 pgs.

Wei, Wei, et al. "Unsupervised recurrent hyperspectral imagery super-resolution using pixel-aware refinement." IEEE Transactions on Geoscience and Remote Sensing 60 (2020): 1-15.

Jalal, Ahmed, et al., "A Depth Video-based Human Detection and Activity Recognition using Multi-features and Embedded Hidden Markov Models for Health Care Monitoring Systems," Jan. 2017, International Journal of Interactive Multimedia and Artificial Intelligence , vol. 4, N°4,https://www.researchgate.net/publication/312483, 10 pgs.

Nadeem, Amir, et al., Automatic human posture estimation for sport activity recognition with robust body parts detection and entropy markov model, Mar. 16, 2021, Multimedia Tools and Applications (2021) 80:21465-21498, pp. 21466-21480.

Christopher Thomas, BSc Hons., MIAP, Deep learning based super resolution, without using a GAN, Feb. 24, 2019 https://towardsdatascience.com/deep-learning-based-super-resolution-without-using-gan - . . . , 50 pgs.

Sajjad et al., Max Planck Institute for Intelligent Systems, EnhanceNet: Single Image Super-Resolution Through Automated Texture Synthesis, Jan. 27, 2020, 19 pgs.

\* cited by examiner

SYSTEMS AND METHODS FOR IDENTIFYING A UNIFIED ENTITY FROM A PLURALITY OF DISCRETE PARTS

The present application is a continuation of U.S. patent application Ser. No. 16/859,214, filed Apr. 27, 2020, the entire contents of which is incorporated herein by reference.

TECHNICAL FIELD

The present invention relates generally to video monitoring systems. More particularly, the present invention relates to systems and methods for identifying a unified entity from a plurality of discrete parts in a sequence of images captured by the video monitoring systems.

BACKGROUND

Known video monitoring systems can identify objects or people within an image or a sequence of images by using background discrimination techniques. However, known systems and methods cannot easily track the objects or the people identified relative to physical obstacles in a region being monitored. For example, known systems and methods rely on identifying the objects or the people as a single entity, which can inhibit tracking the objects or the people relative to the physical obstacles and/or identifying when movement of the objects or the people is indicative of an emergency situation.

In view of the above, there is a need and an opportunity for improved systems and methods.

DETAILED DESCRIPTION

Figure 1:
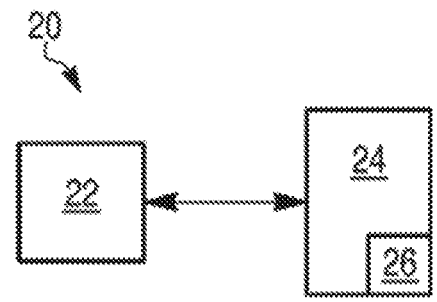
FIG. 1 is a block diagram of a system in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments of the claimed invention can include systems and methods that can identify a unified entity from a plurality of discrete parts. For example, in some embodiments, a video monitoring system can include a camera that can capture a sequence of images of a monitored region and a processor that can receive the sequence of images from the camera and process the sequence of images. In some embodiments, the monitored region can include a sub-region of interest, and in some embodiments, the processor can process the sequence of images using heuristics and rules of an artificial intelligence model. For example, the heuristics and the rules of the artificial intelligence model can (1) identify the plurality of discrete parts that are associated with a type of the unified entity and (2) virtually link together a group of the plurality of discrete parts that correspond to a specific embodiment of the unified entity that is present in the sub-region of interest. In some embodiments, the heuristics and the rules of the artificial intelligence model can be developed from a training process that can include the artificial intelligence model receiving sample images delineating exemplary discrete parts on exemplary embodiments of the unified entity.

In some embodiments, the type of the unified entity can include a human, and in these embodiments, the plurality of discrete parts can include individual body parts of the human, the specific embodiment of the unified entity can include a specific person present in the sub-region of interest, the exemplary discrete parts can include exemplary body parts, and the exemplary embodiments of the unified entity can include one or more exemplary persons. Additionally or alternatively, in some embodiments, the type of the unified entity can include a vehicle, and in these embodiments, the plurality of discrete parts can include individual parts of the vehicle (e.g. wheels, doors, windows, etc.), the specific embodiment of the unified entity can include a specific vehicle present in the sub-region of interest, the exemplary discrete parts can include exemplary vehicle parts, and the exemplary embodiments of the unified entity can include exemplary vehicles. However, the above-identified examples are not limiting, and it should be understood that the type of the unified entity can include any other living creature or animate or inanimate object as would be understood by a person of ordinary skill in the art.

In some embodiments, the processor can track the specific embodiment of the unified entity relative to one or more obstacles in the sub-region of interest by tracking movement of each of the group of the plurality of discrete parts. In some embodiments, the one or more obstacles can include an underwater area, such as a pool, a wall, a pole, a building, or any other physical obstacle in the sub-region of interest. For example, when the unified entity includes the human and the one or more obstacles include the pool, the processor can track the individual body parts of the human relative to a water line in the pool.

In some embodiments, the processor can use the heuristics and the rules of the artificial intelligence model to determine whether the specific embodiment of the unified entity is at least partially occluded by the one or more obstacles. For example, when the unified entity includes the human and the one or more obstacles include the underwater area, the processor can identify the individual body parts of the human that are at least partially occluded by water in the pool. Similarly, when the unified entity includes the human and the one or more obstacles include trees in a yard, the processor can identify the individual body parts of the human that are at least partially occluded by the trees in the yard. In these embodiments, the training process can include the artificial intelligence model identifying the exemplary embodiments of the unified entity being at least partially occluded by the one or more obstacles. Additionally or alternatively, in these embodiments, the group of the plurality of discrete parts can include visible ones of the plurality of discrete parts and at least partially occluded ones of the plurality of discrete parts, and the processor can use the heuristics and the rules of the artificial intelligence model to identify the at least partially occluded ones of the plurality of discrete parts based on a respective type of each of the visible ones of the plurality of discrete parts, a respective location of each of the visible ones of the plurality of discrete parts, and locations of the one or more obstacles within the sub-region of interest.

In some embodiments, the processor can track a total number of one or more types of the plurality of discrete parts that are present in the monitored and/or the sub-region of interest over time. For example, in embodiments in which the plurality of discrete parts include the individual body parts, the processor can track the total number of heads, left arms, right arms, torsos, right legs, left legs, etc. that are present in the monitored region and/or the sub-region of interest over time. In some embodiments, the processor can determine when changes to the total number of one or more of the types of the plurality of discrete parts in the monitored region or the sub-region of interest correspond to the specific embodiment of the unified entity entering or leaving the monitored region or the sub-region of interest, and responsive thereto, can begin to track the specific embodiment of the unified entity, cease tracking the specific embodiment of the unified entity, or initiate and/or transmit an alert signal at or to a user device and/or a central monitoring station for further investigation. For example, the processor can determine that someone being tracked has left the monitored region or the sub-region of interest when the total number of all types of the plurality of discrete body parts decreases by one and, responsive thereto, can cease tracking that person or initiate and/or transmit the alert signal at or to the user device and/or the central monitoring station for further investigation. Similarly, the processor can determine that someone new has entered the monitored region or the sub-region of interest when the total number of at least one type of the plurality of discrete body parts increases by one and, responsive thereto, can begin tracking that person.

In some embodiments, the processor can use the heuristics and the rules of the artificial intelligence model to determine whether the movement of each of the group of the plurality of discrete parts is indicative of an emergency situation or an alarm situation, such as unauthorized access to the sub-region of interest and, responsive thereto, can initiate and/or transmit the alert signal at or to the user device and/or the central monitoring station. In these embodiments, the training process can include the artificial intelligence model identifying positions of the exemplary discrete parts during the emergency situation or the unauthorized access to the sub-region of interest.

For example, in some embodiments, the emergency situation can include certain ones of the plurality of discrete parts being at least partially occluded for a predetermined period of time, such as a head of the specific person being at least partially occluded below the water line of the pool for the predetermined period of time. Additionally or alternatively, in some embodiments, the emergency situation can include failing to identify a predetermined one, some, or all of the plurality of discrete parts for the predetermined period of time, such as failing to identify the head of the specific person or a predetermined one of the individual body parts within the predetermined period of time or failing to identify a car license plate within the predetermined period of time.

In some embodiments, the heuristics and the rules of the artificial intelligence model can virtually link together the group of the plurality of discrete parts based on extrapolating from exemplary groupings of the exemplary discrete parts delineated in the exemplary embodiments of the unified entity as identified in the sample images. Additionally or alternatively, in some embodiments, the heuristics and the rules of the artificial intelligence model can virtually link together the group of the plurality of discrete parts by identifying the respective type of each of the plurality of discrete parts, identifying the respective location of each of the plurality of discrete parts, and identifying each of the plurality of discrete parts for which the respective type and the respective location conform to a model of the unified entity developed from the training process.

FIG. 1 is a block diagram of a system 20 in accordance with disclosed embodiments. As seen in FIG. 1, in some embodiments, the system 20 can include a camera 22 and a processor 24 executing an artificial intelligence model 26.

Figure 2:
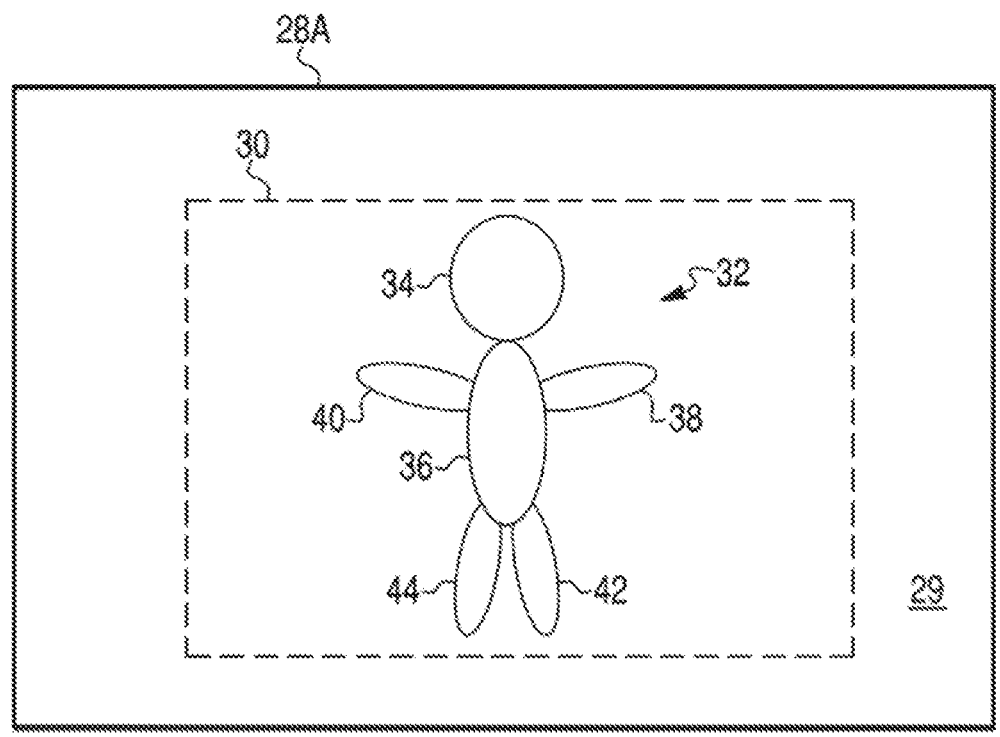
FIG. 2 is a block diagram of one image in a sequence of images as processed by a detection processor in accordance with disclosed embodiments.

FIG. 2 is a block diagram of a first image 28A in a sequence of images captured by the camera 22. As seen in FIG. 2, in some embodiments, the first image 28A can depict a monitored region 29 and can include a sub-region of interest 30 that can include a person 32. The person 32 can be formed from a plurality of discrete parts associated with the person 32 and identified by the artificial intelligence model 26, such as, for example, at least a head 34, a torso 36, a left arm 38, a right arm 40, a left leg 42, and a right leg 44.

Figure 3:
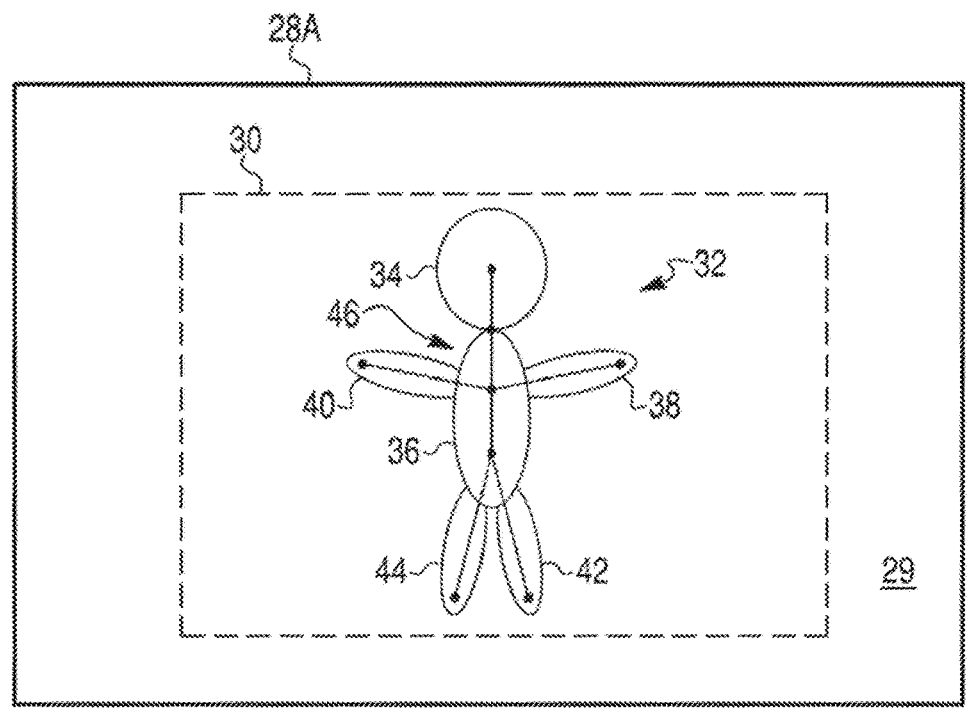
FIG. 3 is a block diagram of one image in a sequence of images as processed by a detection processor in accordance with disclosed embodiments.

FIG. 3 is a block diagram of the first image 28A after processing by the artificial intelligence model 26. As seen in FIG. 3, the artificial intelligence model 26 can construct a virtual model 46 of the person 32 to identify and/or track each of the plurality of discrete parts. For example, in some embodiments, the virtual model 46 can include a wire model of the person 32 with sections corresponding to the plurality of discrete parts.

Figure 4:
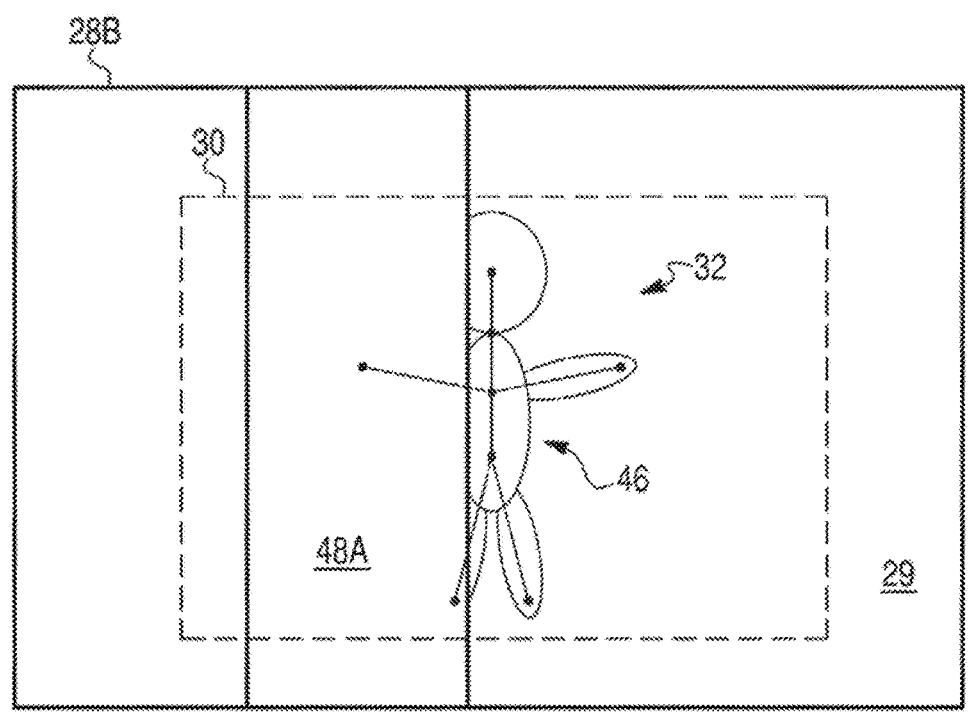
FIG. 4 is a block diagram of one image in a sequence of images as processed by a detection processor in accordance with disclosed embodiments.
Figure 5:
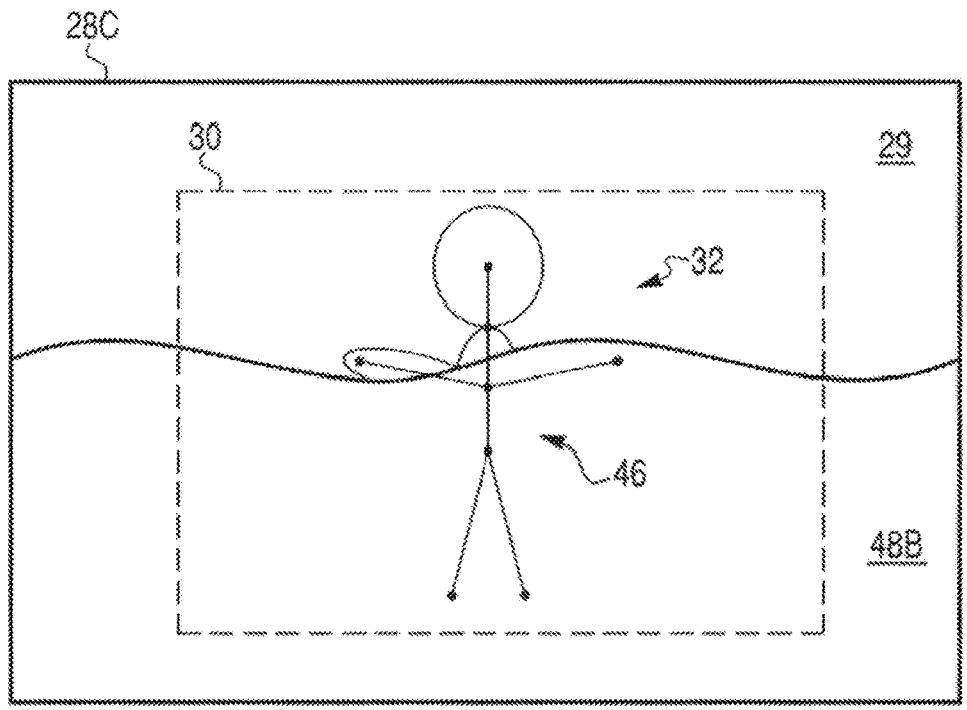
FIG. 5 is a block diagram of one image in a sequence of images as processed by a detection processor in accordance with disclosed embodiments.

FIG. 4 and FIG. 5 are block diagrams of a second image 28B and a third image 28C, respectively, in the sequence of images captured by the camera 22 after processing by the artificial intelligence model 26. As seen in FIG. 4, in some embodiments, the monitored region 29 can include a first physical obstacle 48A, such as a wall, and as seen in FIG. 5, in some embodiments, the monitored region 29 can include a second physical obstacle 48B, such as an underwater area of a pool. In these embodiments, when the person 32 is partially occluded by the first physical obstacle 48A or the second physical obstacle 48B, the artificial intelligence model 26 can construct the virtual model 46 to identify and/or track partially occluded ones of the plurality of discrete parts.

Figure 6:
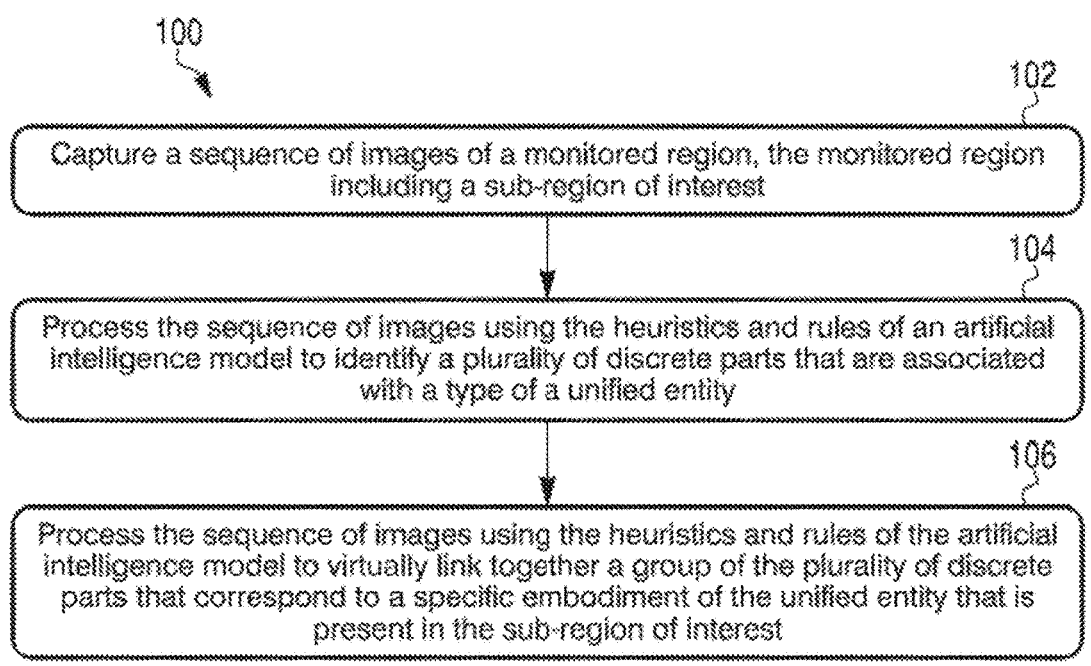
FIG. 6 is a flow diagram of a method in accordance with disclosed embodiments.

FIG. 6 is a flow diagram of a method 100 in accordance with disclosed embodiments. As seen in FIG. 6, the method 100 can include the camera 22 capturing the sequence of images of the monitored region 29, as in 102. Then, the method 100 can include the processor 24 processing the sequence of images using heuristics and rules of the artificial intelligence model 26 to identify the plurality of discrete parts that are associated with a type of a unified entity, as in 104. Finally, the method 100 can include the processor 24 processing the sequence of images using the heuristics and the rules of the artificial intelligence model 26 to virtually link together a group of the plurality of discrete parts that correspond to a specific embodiment of the unified entity that is present in the sub-region of interest (e.g. generating the virtual model 46 of the person 32), as in 106.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
capturing a sequence of images of a monitored region that includes a pool;
processing the sequence of images using heuristics and rules of an artificial intelligence model to identify body parts of a person;
using the heuristics and the rules of the artificial intelligence model to identify occluded body parts that are at least partially occluded by water in the pool based on visible body parts; and
processing the sequence of images using the heuristics and the rules of the artificial intelligence model to virtually link together a group of the body parts that correspond to the person who is present in the pool, wherein the heuristics and the rules of the artificial intelligence model are developed from a training process that includes the artificial intelligence model receiving sample images delineating exemplary human body parts, and virtually linking together the group of the body parts comprises extrapolating from exemplary groupings of the exemplary human body parts delineated in the exemplary human body parts as identified in the sample images; and
using the heuristics and the rules of the artificial intelligence model to determine an emergency situation or an alarm situation based on a position of the body parts relative to the water in the pool.

2. The method of claim 1, wherein determining the emergency situation or the alarm situation is based on determining that one or more certain body parts have been occluded by water in the pool for a predetermined period of time.

3. The method of claim 2, wherein the one or more certain body parts comprise the head of the person.

4. The method of claim 3, wherein determining that the head of the person has been occluded by water in the pool for the predetermined period of time comprises failing to identify the head of the person for the predetermined period of time.

5. The method of claim 1, further comprising, responsive to determining the emergency situation, using the heuristics and the rules of the artificial intelligence model to initiate and/or transmit an alert signal at or to a user device and/or a central monitoring station.

6. The method of claim 1, further comprising using the heuristics and the rules of the artificial intelligence model to track movement of each of the group of the body parts.

7. The method of claim 1, wherein the training process includes the artificial intelligence model identifying exemplary persons being at least partially occluded by the water in the pool.

8. The method of claim 1, further comprising using the heuristics and the rules of the artificial intelligence model to virtually link together the group of the body parts by identifying a respective type of each of the body parts, identifying a respective location of each of the body parts, and identifying each of the body parts for which the respective type and the respective location conform to a model of the person developed from the training process.

9. The method of claim 1, further comprising using the heuristics and the rules of the artificial intelligence model to identify the person.

10. A system comprising:
a camera that captures a sequence of images of a monitored region that includes a pool; and
a processor that receives the sequence of images and processes the sequence of images using heuristics and rules of an artificial intelligence model that are developed from a training process that includes the artificial intelligence model receiving sample images delineating exemplary human body parts, the processor using the heuristics and the rules of the artificial intelligence model to:
identify visible body parts of a person in the pool,
identify occluded body parts of the person in the pool based on the visible body parts, the occluded body parts being at least partially occluded by water in the pool,
virtually link together the visible body parts and the occluded body parts based on extrapolating from exemplary groupings of the exemplary human body parts delineated in the exemplary human body parts as identified in the sample images, and
determine an emergency situation or an alarm situation based on a position of the visible body parts and the occluded body parts relative to the water in the pool.

11. The system of claim 10, wherein the processor uses the heuristics and the rules of the artificial intelligence model to determine the emergency situation or the alarm situation based on determining that one or more certain body parts have been occluded by water in the pool for a predetermined period of time.

12. The system of claim 11, wherein the one or more certain body parts comprise the head of the person.

13. The system of claim 12, wherein determining that the head of the person has been occluded by water in the pool for the predetermined period of time comprises failing to identify the head of the person for the predetermined period of time.

14. The system of claim 10, wherein the processor uses the heuristics and the rules of the artificial intelligence model to, responsive to determining the emergency situation, initiate and/or transmit an alert signal at or to a user device and/or a central monitoring station.

15. The system of claim 10, wherein the processor uses the heuristics and the rules of the artificial intelligence model to track movement of each of the visible body parts and the occluded body parts.

16. The system of claim 10, wherein the training process includes the artificial intelligence model identifying exemplary persons being at least partially occluded by the water in the pool.

17. The system of claim 10, wherein the heuristics and the rules of the artificial intelligence model virtually link together the visible body parts and the occluded body parts by identifying a respective type of each of the visible body parts and the occluded body parts, identifying a respective location of each of the visible body parts and the occluded body parts, and identifying each of the visible body parts and the occluded body parts for which the respective type and the respective location conform to a model of the person developed from the training process.

18. The system of claim 10, wherein the processor uses the heuristics and the rules of the artificial intelligence model to identify the person.

19. A method comprising:
capturing a sequence of images of a monitored region that includes a pool;
processing the sequence of images using heuristics and rules of an artificial intelligence model to identify body parts of a person;
using the heuristics and the rules of the artificial intelligence model to identify occluded body parts that are at least partially occluded by water in the pool based on visible body parts; and
processing the sequence of images using the heuristics and the rules of the artificial intelligence model to virtually link together a group of the body parts that correspond to the person who is present in the pool, wherein the heuristics and the rules of the artificial intelligence model are developed from a training process that includes the artificial intelligence model receiving sample images delineating exemplary human body parts, and virtually linking together the group of the body parts comprises:
identifying a respective type of each of the body parts,
identifying a respective location of each of the body parts, and
identifying each of the body parts for which the respective type and the respective location conform to a model of the person developed from the training process; and
using the heuristics and the rules of the artificial intelligence model to determine an emergency situation or an alarm situation based on a position of the body parts relative to the water in the pool.

20. The method of claim 19, wherein determining the emergency situation or the alarm situation is based on determining that the head of the person has been occluded by water in the pool for a predetermined period of time.

\* \* \* \* \*